United States Patent [19]
Hess

[11] 3,872,820
[45] Mar. 25, 1975

[54] CAR POSITION SPOTTING DEVICE IN GARAGES

[76] Inventor: Christian F. Hess, 329 Meadow Lark Rd., Bloomingdale, Ill.

[22] Filed: Nov. 10, 1972

[21] Appl. No.: 305,422

[52] U.S. Cl. .............................................. 116/28 R
[51] Int. Cl. ................................................ B60q 9/00
[58] Field of Search ............ 116/28 R, 94, 100, 122, 116/63 P, 63 R; 33/393; 160/201, 193

[56] References Cited
UNITED STATES PATENTS
| | | | |
|---|---|---|---|
| 1,731,964 | 10/1929 | Amsler | 116/35 A |
| 2,166,520 | 7/1939 | Challoner | 116/28 R X |
| 2,854,942 | 10/1958 | Ross | 116/28 R |
| 3,439,728 | 4/1969 | Martini | 160/193 |
| 3,714,923 | 2/1973 | Mariani | 116/114 R |
| 3,817,203 | 6/1974 | Brauer | 116/28 R |

Primary Examiner—Richard C. Queisser
Assistant Examiner—Daniel M. Yasich
Attorney, Agent, or Firm—Wegner, Stellman, McCord, Wiles & Wood

[57] ABSTRACT

A car spotting device for use in garages having closable doors for indicating to the driver of the vehicle entering the garage when the vehicle is at a predetermined position therein and for further indicating to the driver when he seeks to leave the garage that the door thereof is closed. Included is a target that is mounted in the garage and positioned to be engaged by a vehicle at which position it is obviously visible to the driver. The target is mounted for movement to another position not obviously visible to the driver and a connection is established between the target and the garage door for moving the target to the first position when the door is open and moving the target to the second position when the door is closed. Thus, when a vehicle entering the garage engages the target, a perceptible indication that the vehicle has attained its predetermined position is provided to the driver; and when a driver seeks to remove the vehicle from the garage, the lack of the presence of the target in the obviously visible first position provides an indication that the garage door should be opened.

8 Claims, 4 Drawing Figures

PATENTED MAR 25 1975　　3,872,820

CAR POSITION SPOTTING DEVICE IN GARAGES

BACKGROUND OF THE INVENTION

This invention relates to car spotting devices for use in garages for indicating to drivers of vehicles when the vehicle is at a predetermined position within the garage.

Ross, in U.S. Pat. No. 2,854,942, discloses a car spotting device including a resilient ball-like structure suspended by the ceiling of a garage on a cord or the like. The same is so located in a garage that a driver of a vehicle entering the same will observe when the ball is moved due to engagement of an automobile therewith. The Ross device has its major deficiency in the fact that the only indication provided that a vehicle has attained the proper position within the garage is by movement of the ball generally parallel to the driver's line of sight, which movement is somewhat difficult to perceive.

Another form of spotting device is disclosed by Fritz in U.S. Pat. No. 3,664,291 wherein an elongated, flexible ribbon, weighted at its lower end is employed in essentially the same manner as Ross. The Fritz device provides the advantage of allowing lateral spacing, but is otherwise subject to the same deficiencies as the Ross device.

Other forms of spotting devices are disclosed by Evans in U.S. Pat. No. 2,706,462 and Pavitt in U.S. Pat. No. 1,981,188. One embodiment disclosed by Pavitt is perhaps the most useful in that an indicator is mounted for substantial movement in a direction transverse to the line of vision of the driver to thereby provide a highly perceptible indication that the vehicle has attained its proper position. However, Pavitt's system is relatively expensive and difficult to install and is only capable of providing the aforementioned indication. That is, other desired indicating functions cannot be performed with the Pavitt construction.

SUMMARY OF THE INVENTION

It is the principal object of the invention to provide a new and improved car spotting device. More specifically, it is an object of the invention to provide a car spotting device that will provide a highly perceptible indication when a vehicle being moved into a garage has reached a predetermined position therein and which will further indicate that the door of the garage is closed when a driver is desirous of exiting the garage in the vehicle.

The exemplary embodiment of the invention achieves the foregoing objects in a structure which, in its most basic sense, includes a target engageable by a vehicle and positionable in a garage so as to be engaged by a vehicle when the vehicle is at a predetermined position therein; a means for mounting the target for movement between first position wherein the above described function can occur and a second position whereat the target is not obviously visible to the driver of the vehicle; and a means connected to one of the mounting means and the target and connectible to the door of the garage to be responsive to movement thereof for moving the target to the first position when the garage door is open and for moving the target to the second position when the garage door is closed, the latter thereby providing an indication that the garage door is closed by reason of the relative lack of visibility of the target to the driver.

According to the preferred embodiment, the target is formed of a relatively flat thin member and is capable of pivoting relative to the mounting means upon being engaged by a vehicle. Thus, when a vehicle engages the same, it will immediately pivot so that movement of the target is not confined to a direction coextensive with the line of vision of the driver, thereby providing a highly perceptible indication that the vehicle has reached its proper position.

For simplicity, the means interconnecting the target to the garage door comprise a flexible cord-like element having one end secured to the target and the opposite end thereof secured, as by a screw eye, to the garage door. Intermediate the ends of the cord-like element, the mounting means slidably receives the cord and is fixed to a stationary portion of the garage, usually the ceiling thereof. In a preferred form of the invention, the mounting means consists of a simple screw eye.

The invention also contemplates aligning means whereby the driver of a vehicle can achieve side to side alignment of the vehicle within a garage.

Also provided is a stop means on the cord intermediate the mounting means and the ends secured to the garage door for halting movement of the target when it reaches its first position. The stop means is employed to define the first position of the target and preferably is in the form of a spool to thereby provide the additional function of providing for effective length adjustment of the cord.

A preferred form of the invention further includes an additional effective length adjusting means for the cord at its point of connection to the target.

Other objects and advantages of the invention will become apparent from the following specification taken in conjunction with the accompanying drawings.

DESCRIPTION OF THE PREFERRED EMBODIMENT

Figure 1:
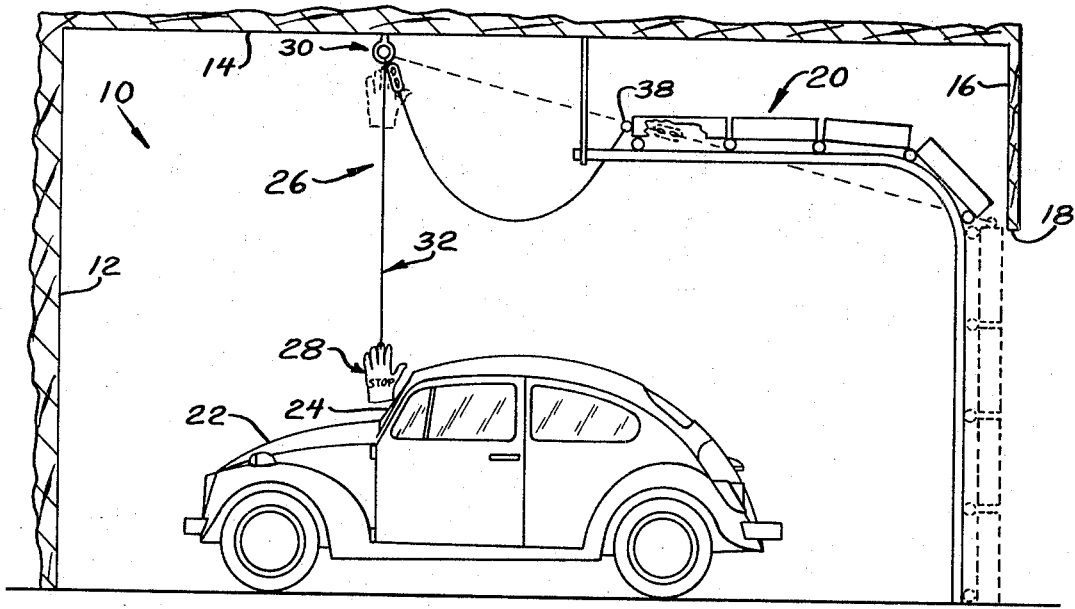
FIG. 1 is a somewhat schematic side elevation of a garage provided with a car spotting device made according to the invention.

An exemplary embodiment of a car spotting device made according to the invention is illustrated in the environment of a garage, generally designated 10, having a front wall 12, a ceiling 14, a rear wall 16 provided with an entrance and exit opening 18, and an overhead door system, generally designated 20 adapted to close the opening 18. The particular form of the door system 20 forms no part of the instant invention and may be regarded as conventional for purposes of this disclosure. Moreover, it should be noted that the invention is not limited to use with overhead door systems and can be used with doors openable on hinges providing a vertical pivot axis therefor. It will be readily seen that the principles of the invention are equally applicable to such door systems.

Within the garage 10 is a vehicle 22 having a windshield 24. As shown, the vehicle 22 is in a predetermined position within the garage 10. Of course, it will be recognized that the predetermined position will vary depending upon the size of the garage, the size of the vehicle, and the particular needs or desires of the owner or user of the garage.

As illustrated in FIG. 1, the vehicle 22 has been stopped at the predetermined position by the driver of the vehicle by reason of the presence of a car spotting system, generally designated 26, made according to the invention. As generally alluded to previously, the car spotting system is comprised of three basic components. The first includes a target, generally designated 28. The second includes a mounting means, generally designated 30 for the target 28 whereby the target may be moved between a first position (shown in full lines) and a second position (shown in dotted lines). The third component is a means interconnecting one of the mounting means 30 and the target 28 to the door 20 and responsive to movement of the door 20 between open and closed position for movement of the target 28 between its first and second positions, respectively. Such a means is generally designated 32 and is disclosed herein as specifically connected to the target 28 via the mounting means 30, although those skilled in the art will recognize that there need not be a direct connection to the target 28 depending upon the nature of the mounting means employed.

Figure 2:
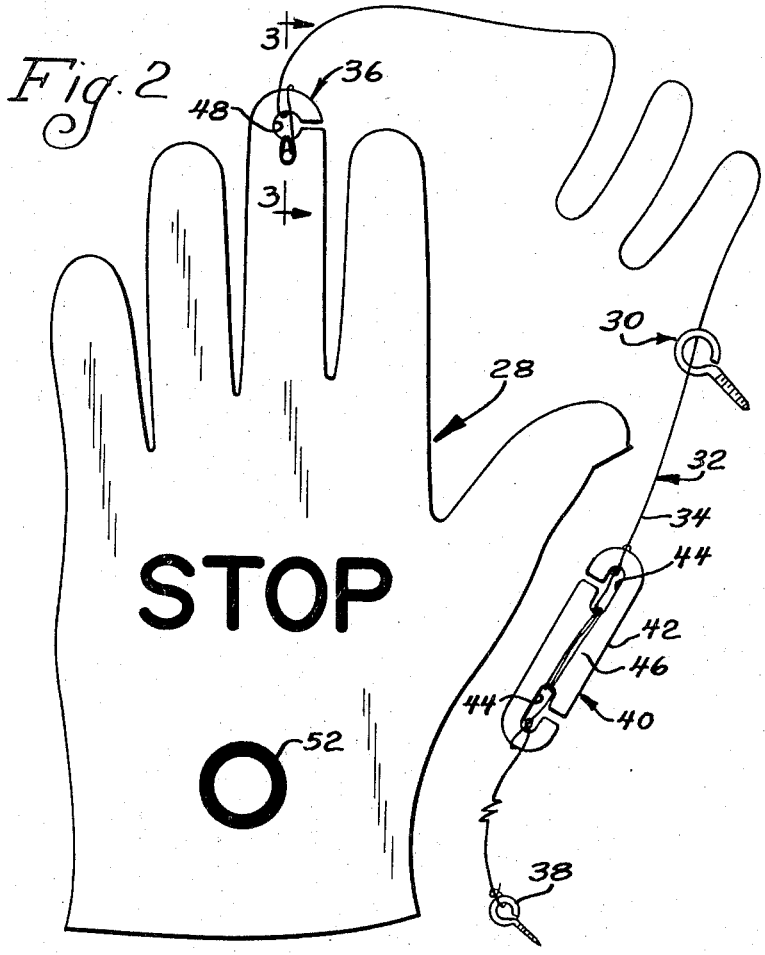
FIG. 2 is a plan view of various components of the car spotting device apart from the garage.

With reference to all figures of the drawing, the car spotting system 26 will be described in greater detail. Preferably, the target 28 is formed of a relatively thin flat member as, for example, ⅛ inch hardboard. The same is configured in the form of a hand bearing the legend "STOP" as seen in both FIGS. 1 and 2, although other shapes and/or legends could be employed if desired. The mounting means 30 as best seen in FIG. 2 comprises a simple screw eye which may be affixed to the ceiling 14 of the garage 10 as indicated in FIG. 1.

The interconnecting means 32 is preferably formed of a flexible cord-like element 34 which may be formed of lightweight chain, suitable flexible wire, a fabric cord, a plastic cord, or any of a variety of similar elements. The interconnecting means 32 is connected to the target 28 at one end as generally designated at 36 and includes a securing means in the form of an eye 38 at its opposite end which may be connected to the door 20. The mounting means 30 is preferably oriented such that the target 28 may be engaged by a windshield 24 of a vehicle 22 entering the garage 10 when the door 20 is open. As will be seen, means are provided to insure the proper vertical location of the target 28 for this purpose, and as can be seen in full lines in FIG. 1, when the door 20 is open, the target 28 is lowered to its first position whereat it may be engaged by the windshield 24 of the vehicle 22. On the other hand, when the door 20 is closed as illustrated in dotted lines, the cord 34 will be drawn to the right as viewed in FIG. 1, thereby elevating the target 28 to its second position (shown in dotted lines) where it is not obviously visible to the driver of the vehicle. Thus, when the driver enters the vehicle and fails to see the target 28, he is apprised that the garage door 20 is in its closed position and that the same must be opened before the vehicle 22 may be removed from the garage.

Since the maximum permissible length of movement of the target 28 between its two positions will vary from garage to garage, and will be dependent upon the configuration of the vehicle 22 and length of the path of movement of the door 20 between an open and closed position, a stop means, generally designated 40 is located on the cord between the end to be secured to the garage door 20 by a screw eye 28 and the mounting means defined by the screw eye 30. The stop means 40 is configured to be sufficiently large that it will not pass through the screw eye 30 thereby limiting downward movement of the target 28. By adjustably positioning the stop means 40 on the cord 38, there may be provided sufficient slack in the cord between the mounting means 30 and the door 20 to serve as a lost motion connection in the event the length of travel of the door 20 from the open position to the closed position is greater than the maximu permitted length of travel of the target 28 between its first and second positions.

Preferably, the stop means 40 is configured in the form of a spool defined by a relatively flat piece of material 42 having keyhole opening 44 adjacent its opposite end which keyhole slot openings 44 are separated by an elongated flat 46. Thus, the effective length of the cord 34 may be adjusted by winding the cord 34 about the flat 46 any number of times. In other words, the stop means 40 is defined by a relatively simple form of spool to provide an effective length adjusting means for the cord.

Figure 3:
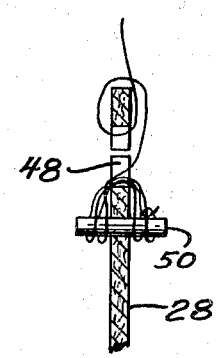
FIG. 3 is a fragmentary section taken approximately along the line 3—3 of FIG. 2.

If desired, an additional effective length adjusting means can be provided at the point of connection of the cord 34 to the target 28. As best seen in FIGS. 2 and 3, the upper end of the target 38 is provided with a keyhole slot 48 about which the cord may be wound. In addition, transverse to the point of the target 28 and extending to the same on both sides thereof is a pin 50. As can be seen from FIGS. 2 and 3 the effective length of the cord 32 may be changed by winding or unwinding a portion of the same to the slot 48 and about the pin 50.

Figure 4:
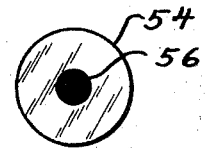
FIG. 4 is a plan view of a portion of an aligning means.

FIGS. 2 and 4 also illustrate an aligning means whereby the driver of the vehicle may achieve side to side alignment of the vehicle within the predetermined position within the garage. In particular, the target 28 is provided with indicia 52 in the form of a circle directly below the point of attachment of the cord 34 while a transparent decal 54 having a darkened spot 56 may be adhered to the vehicle windshield 24. When entering the garage, the driver may sight along the spot 56 to center the same in the circle 52 to thereby achieve side to side alignment. In the event the circle 52 is not visible, as would be the case when the plane of the target is perfectly parallel to the driver's line of vision, the driver need only center the spot on the side of the target 28 to achieve the same result, since the circle 52 is vertically aligned with the pivot axis for the target defined by the vertical drop of the cord 34.

The system is installed in a garage as generally illustrated in FIG. 1 and appropriate adjustments and effective length of the cord may be made as necessary through the use of one of the other or both of the effective length adjustment means described previously. It will also be recognized that due to the thin flat nature of the target 28 and its connection to the cord thereby providing a pivot for the target 28 is such that virtually at no time will the plane of the target 28 be transverse to the line of vision of the driver of the vehicle 22. Thus, when the vehicle windshield engages the target 28, not only will it tend to move the same in a direction coextensive with the line of sight of the driver, but it will tend to pivot the same about a pivot axis defined by the vertical drop of the cord 32 until the plane of the target 28 is approximately transverse to the line of sight of the vehicle. This turning movement of the target upon engagement of the same by the windshield of the vehicle 24 provides a highly perceptible visible indication to the driver that the vehicle has reached its predetermined position in the garage.

From the foregoing, it will be appreciated that a car spotting system made according to the invention is extremely simple and easy to construct and install in a garage; eliminate the difficulties of many prior art structures by providing a highly perceptible indication of engagement of the vehicle therewith and further provide an indication to the driver of a vehicle seeking to remove the vehicle from the garage that the garage door is shut and must be opened preliminary to the moving the vehicle from the garage.

I claim:

1. A car spotting device for use in garages having closable doors to indicate to a driver of a vehicle entering the garage when the vehicle is at a predetermined position therein and for indicating to the driver of a vehicle seeking to leave the garage that the door thereof is closed, said device comprising:

means defining a target visible to the driver of a vehicle in a garage and adapted to be engaged by the vehicle to be moved thereby to provide a perceptible indication of such engagement to the driver, said target being positionable in a garage so as to first be engaged by a vehicle when the vehicle is approximately at said predetermined position;

means for mounting said target for movement within a garage between first and second positions, said first position being one wherein the target will be obviously visible to a driver and will be first engaged by a vehicle when a vehicle entering the garage has moved to approximately said predetermined position and said second position being one remote from said first position and wherein said target will not be obviously visible to a driver; and means associated with at least one of said target and said mounting means and connectable to the door of the garage to be responsive to movement thereof for moving said target to said first position when the garage door is open and for moving said target to said second position when the garage door is closed;

whereby said target, when in said first position, provides an indication to the driver of a vehicle entering the garage that the vehicle has attained said predetermined position, and when in said second position, provides an indication to the driver of a vehicle about to exit the garage that the garage door is closed.

2. The invention of claim 1 further including means providing for pivotal movement of said target when in said first position and wherein said target is positionable to be engaged by the windshield of a vehicle when in said first position and is defined by a thin, flat member, whereby, upon engagement of said target by a windshield, said target will pivot to provide said perceptible indication.

3. The invention of claim 1 wherein said means connectable to a garage door includes an elongated flexible cord-like member having one end secured to said target, and securing means at its opposite end to be fixed to a garage door; and said mounting means includes an element having means for slidably receiving said cord-like member intermediate the ends thereof, and means connecting said mounting means to a stationary portion of a garage structure.

4. The invention of claim 3 further including stop means adjustable fixed to said cord-like member between said mounting means and said other end for selectively limiting slidable movement of said cord-like element and said target as said target moves toward said first position to thereby determine said first position.

5. The invention of claim 4 wherein said stop means is a spool thereby further defining cord-like member effective length adjusting means.

6. The invention of claim 5 further including means providing for pivotal movement of said target when in said first position and wherein said target is positionable to be engaged by the windshield of a vehicle when in said first position and is defined by a thin, flat member, whereby, upon engagement of said target by a windshield, said target will pivot to provide said perceptible indication.

7. The invention of claim 6 wherein said thin flat member is configured in the form of a hand, said mounting means and said securing means are each defined by a screw-eye; and further including additional cord-like member effective length adjusting means on said thin flat member at the point of connection of the same to said cord-like member.

8. A garage incorporating the car spotting device of claim 1 including a structure having a ceiling, a floor, a wall having an entrance and exit opening and a door system for selectively opening and closing said entrance and exit opening, said floor, ceiling and wall defining a vehicle receiving space; said target being located within said structure; said mounting means being within and affixed to said structure to mount said target such that when in said first position, said target will be within said structure and said vehicle receiving space at a location intermediate said floor and said ceiling to be engaged by a vehicle entering said structure; and said moving means being connected to said door system.

* * * * *